United States Patent
Tarleton et al.

(10) Patent No.: US 9,510,180 B2
(45) Date of Patent: Nov. 29, 2016

(54) MOBILE MANAGEMENT MESSAGE DISTRIBUTION AND ACTIVE ON-NETWORK DETERMINATION

(71) Applicants: Bryan Tarleton, Buford, GA (US); Michael J. Criscolo, Dunwoody, GA (US); Wayne Stargardt, Smyrna, GA (US)

(72) Inventors: Bryan Tarleton, Buford, GA (US); Michael J. Criscolo, Dunwoody, GA (US); Wayne Stargardt, Smyrna, GA (US)

(73) Assignee: Numerex Corp., Atlanta, CA (US)

( * ) Notice: Subject to any disclaimer, the term of this patent is extended or adjusted under 35 U.S.C. 154(b) by 137 days.

(21) Appl. No.: 14/272,709

(22) Filed: May 8, 2014

(65) Prior Publication Data

US 2015/0208229 A1    Jul. 23, 2015

Related U.S. Application Data

(60) Provisional application No. 61/929,643, filed on Jan. 21, 2014.

(51) Int. Cl.
| | |
|---|---|
| *H04W 8/10* | (2009.01) |
| *H04W 4/14* | (2009.01) |
| *H04W 4/12* | (2009.01) |
| *H04W 88/18* | (2009.01) |

(52) U.S. Cl.
CPC .............. *H04W 8/10* (2013.01); *H04W 4/14* (2013.01); *H04W 4/12* (2013.01); *H04W 88/184* (2013.01)

(58) Field of Classification Search
CPC ..... H04W 4/14; H04W 92/02; H04W 88/16; H04W 8/10; H04W 12/06; H04W 88/184; H04W 4/12
See application file for complete search history.

(56) References Cited

U.S. PATENT DOCUMENTS

| | | | | |
|---|---|---|---|---|
| 8,325,642 | B1* | 12/2012 | McHenry | H04W 4/12 370/310 |
| 2005/0233756 | A1* | 10/2005 | Cho | H04W 88/184 455/466 |
| 2006/0123078 | A1* | 6/2006 | Mendiola | H04L 29/12009 709/203 |
| 2009/0163181 | A1 | 6/2009 | Ung | |
| 2010/0136981 | A1* | 6/2010 | Agarwal | H04W 4/16 455/445 |
| 2011/0086628 | A1* | 4/2011 | Karuturi | H04Q 3/0029 455/418 |
| 2011/0230212 | A1* | 9/2011 | Cai | H04W 68/00 455/466 |

OTHER PUBLICATIONS

European Search Report for European Patent Application EP 15151837.0, issued Jun. 2, 2015.

(Continued)

*Primary Examiner* — Vladimir Magloire
*Assistant Examiner* — Ernest Tacsik
(74) *Attorney, Agent, or Firm* — King & Spalding LLP

(57) ABSTRACT

An application interface can support real-time mobile management notification. The application interface can have integrated Home Location Registry (HLR) mobile management signaling, such as Signal System 7 (SS7). An HLR database can contain mobile management registration messages, for example Update Location or Ready for Short Message (SM). A real-time feed can be received from the HLR database. Mobile management messages received via the feed can translated into application notification messages. The translated application notification messages can be delivered to registered applications that may reside on an external customer network.

15 Claims, 3 Drawing Sheets

(56) References Cited

OTHER PUBLICATIONS

"3$^{rd}$ Generation Partnership Project; technical Specification Group Services and System Aspects; Support of Short Message Services (SMS) over generic 3GPP Internet Proto-col (IP) access; Stage 2 (Release 12)", 3GPP Draft; 23204-C40_CR_Implemented, Dec. 16, 2013.

* cited by examiner

MOBILE MANAGEMENT MESSAGE DISTRIBUTION AND ACTIVE ON-NETWORK DETERMINATION

CROSS REFERENCE TO RELATED APPLICATIONS

This application claims priority to U.S. Provisional Patent Application No. 61/929,643 filed Jan. 21, 2014, designating co-inventors Bryan Tarleton, Michael Criscolo, and Wayne Stargardt and entitled "Method for Real Time Mobile Management Message Distribution and Active On-Network Determination," the entire contents of which are hereby incorporated herein by reference.

TECHNICAL FIELD

The present technology relates generally to communication signaling, and more specifically to a system and method for providing SS7 mobile management signaling messages for use by applications outside an SS7 network.

BACKGROUND

Switched telephone network elements are typically networked together with a special purpose data communications network designated Signaling System 7 (SS7). The SS7 network communicates signaling information necessary to set up and manage telephony calls in a separate telecommunications network. SS7 uses what is called out-of band signaling, meaning that signaling (control) information travels on a separate channel, rather than within the same channel as the telephone call. SS7 is a global standard for telecommunications defined by the International Telecommunication Union (ITU) Telecommunication Standardization Sector (ITU-T). The standard specifies procedures and protocol by which network elements in the public switched telephone network (PSTN) exchange information over a digital signaling network to effect wireless (cellular) and wire line call setup, routing, and control. The ITU definition of SS7 allows for national variants such as the American National Standards Institute (ANSI) and Bell Communications Research (Telcordia Technologies) standards used in North America and the European Telecommunications Standards Institute (ETSI) standard used in Europe. The Home Location Register (HLR) is a database element of a SS7 network that contains details of each mobile phone subscriber that is authorized to use the associated network.

Conventional SS7 functionality in general, and more specifically the HLR SS7 element, constrains mobile management signaling to within the SS7 network. The distribution of such messages beyond the HLR is generally unavailable to applications outside the SS7 network to maintain and manage a database of mobile network status and availability. For example, when a device registers to the mobile network, an 'Update Location' message is typically sent to the HLR to inform of the current mobile location and serving network. This information is stored by the HLR for use subsequently when needed to contact the device. With conventional technology, registration event information is not generally accessible in real time to entities outside the SS7 network. This happens because, with conventional technology, the HLR signaling lacks availability for non-SS7 applications. For instance, an application that needs to communicate with the device can use the registration event to trigger a Mobile Terminate (MT) message.

In view of the foregoing, a need exists for a capability to provide access to at least a subset of mobile management signaling messages for applications outside of the SS7 network. A technology filling this need, or some related deficiency in the art, would improve communications. For example, such a capability could support or enable a host of services that depend upon knowledge of the real-time status of subscribed mobile devices.

SUMMARY

HLR mobile management SS7 signaling can be integrated with an application interface to provide mobile management notification. This can be implemented by receiving a real-time feed from the HLR database containing mobile management registration messages (such as Update Location or Ready for SM) and translating the mobile management messages into application notification messages that are delivered to registered applications.

An application registration database can be utilized where applications designate the mobile devices that will be monitored. Registration can include specific devices or allow for all devices associated with the application. Additionally, the registration process can be integrated with a Short Message Service Center (SMSC), such that when the SMSC detects a specific Mobile Termination failure result for a registered application, the mobile device is automatically added to the registration database. Each mobile management message received from the HLR can be compared to registered devices. If a match occurs, the registration entry for the device can be removed, and the mobile management message translated into an application protocol message and transferred to the application. Thus, the translated message can have a protocol that is compatible with the application. The application can then perform appropriate functionality, for example generate an MT message to contact the device, update an application database, or some other appropriate action or function.

The foregoing discussion is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

BRIEF DESCRIPTION OF THE FIGURES

Reference will be made below to the accompanying drawings.

Figure 1:
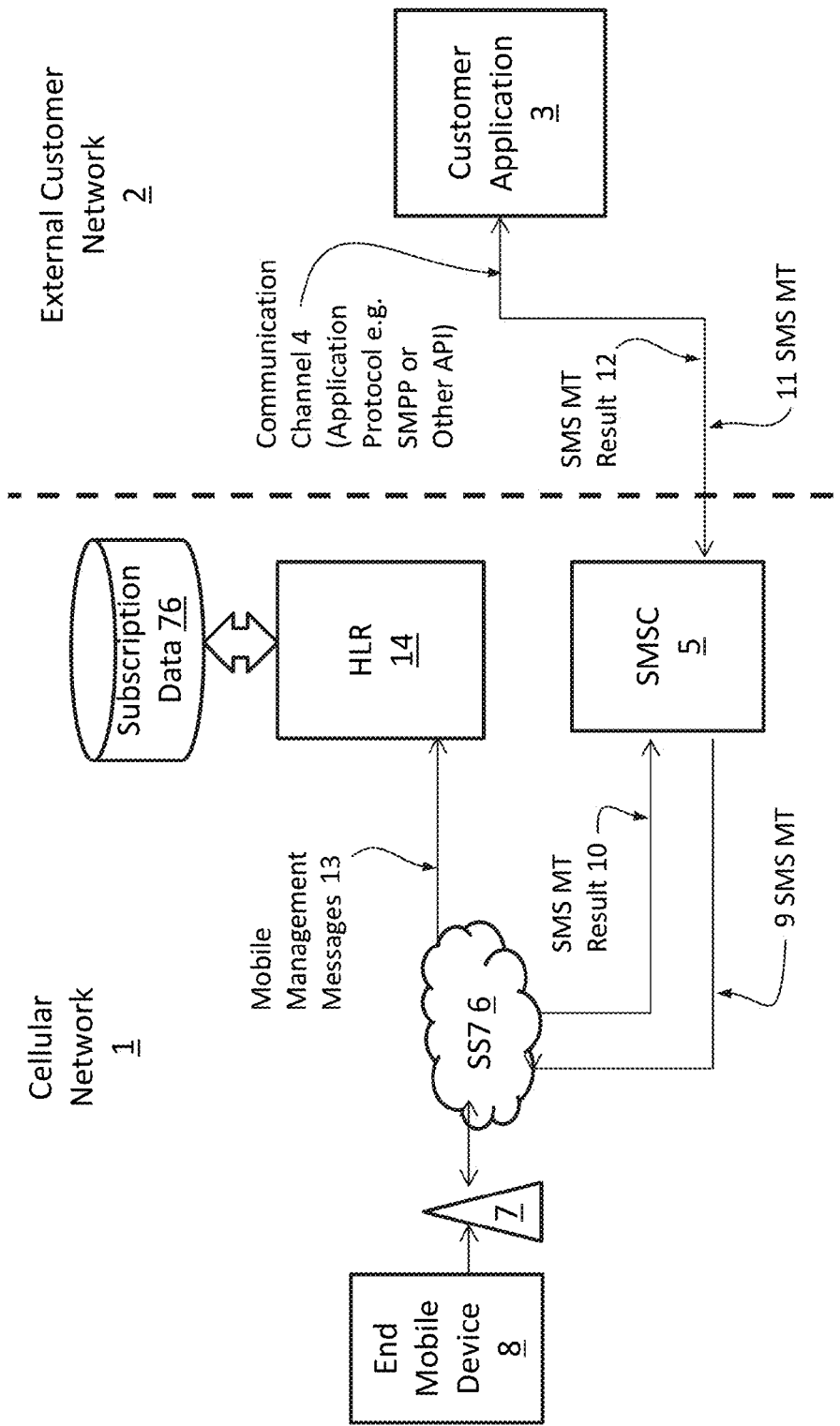
FIG. 1 illustrates a functional block diagram of a system providing an exemplary operating environment for an embodiment of the invention, with control messages and SMS messages flowing through mobile networks in accordance with international standards.

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DETAILED DESCRIPTION OF EXAMPLE EMBODIMENTS

Representative embodiments of the technology will be described more fully hereinafter with example reference to the accompanying drawings. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Turning now to FIG. 1, this figure illustrates a functional block diagram of a system 100 providing an example operating environment for an embodiment of the technology, with control messages and SMS messages flowing through a cellular network 1 in accordance with international standards. The system 100 comprises an external customer network 2 that supports customer applications 3 and that is linked to the cellular network 1. In an example embodiment, the cellular network 1 can comprise a telecommunications carrier network and/or a mobile network.

The external customer network 2 provides a communication path at or to facilities of a customer. The external customer network 2 may comprise a proprietary network belonging to a customer, for example. More generally, the illustrated external customer network 2 can represent a facility or facilities that house one or more customer applications 3 and/or one or more associated communication paths.

The customer application 3 may comprise a security application, a vehicle tracking application, or a supply chain management application, to mention a few representative examples without limitation. The customer application 3 may comprise an application that would need or benefit from a capability to send one or more command and control messages to one or more end mobile devices 8, for example. Such a message might comprise an alarm acknowledgement or a location request, for example.

In operation, the customer application 3 in the customer network 2 submits a Short Message Service (SMS) Mobile Terminate message (SMS MT) 11 to the SMSC 5 within the cellular network 1 via a communications channel 4. While the cellular network 1 is illustrated by example, other types of telecommunications networks that may utilize SS7 signaling are supported by the present technology. Standard Short Message Peer-to-Peer (SMPP) protocol may be utilized, for example. The SMSC 5 submits the received SMS MT message 9 to the serving SS7 network 6 over interconnecting SS7 communications links. The serving SS7 network 6 attempts to deliver the message to the end mobile device 8 via a wireless telecommunications system 7. The SMST MT result 10 from the wireless telecommunications system 7 is delivered to the SMSC 5 over interconnecting SS7 communications links. The SMSC 5 sends the SMS MT result 12 of the SMS MT attempt 11 to the customer application 3. Mobile management messages 13 are constantly streamed to the serving HLR 14, independent of any other activity, to register presence and location and to authenticate mobile devices 8. The HLR 14 has an associated subscription database 76. The mobile management messages 13 (e.g., Location Updates) can be integral with the cellular network 1, without interfacing with applications outside the wireless telecommunications system 7 and associated SS7 network elements. As will be discussed in further detail below, the system 100 can be upgraded to support enhanced signaling with the customer application 3.

Figure 2:
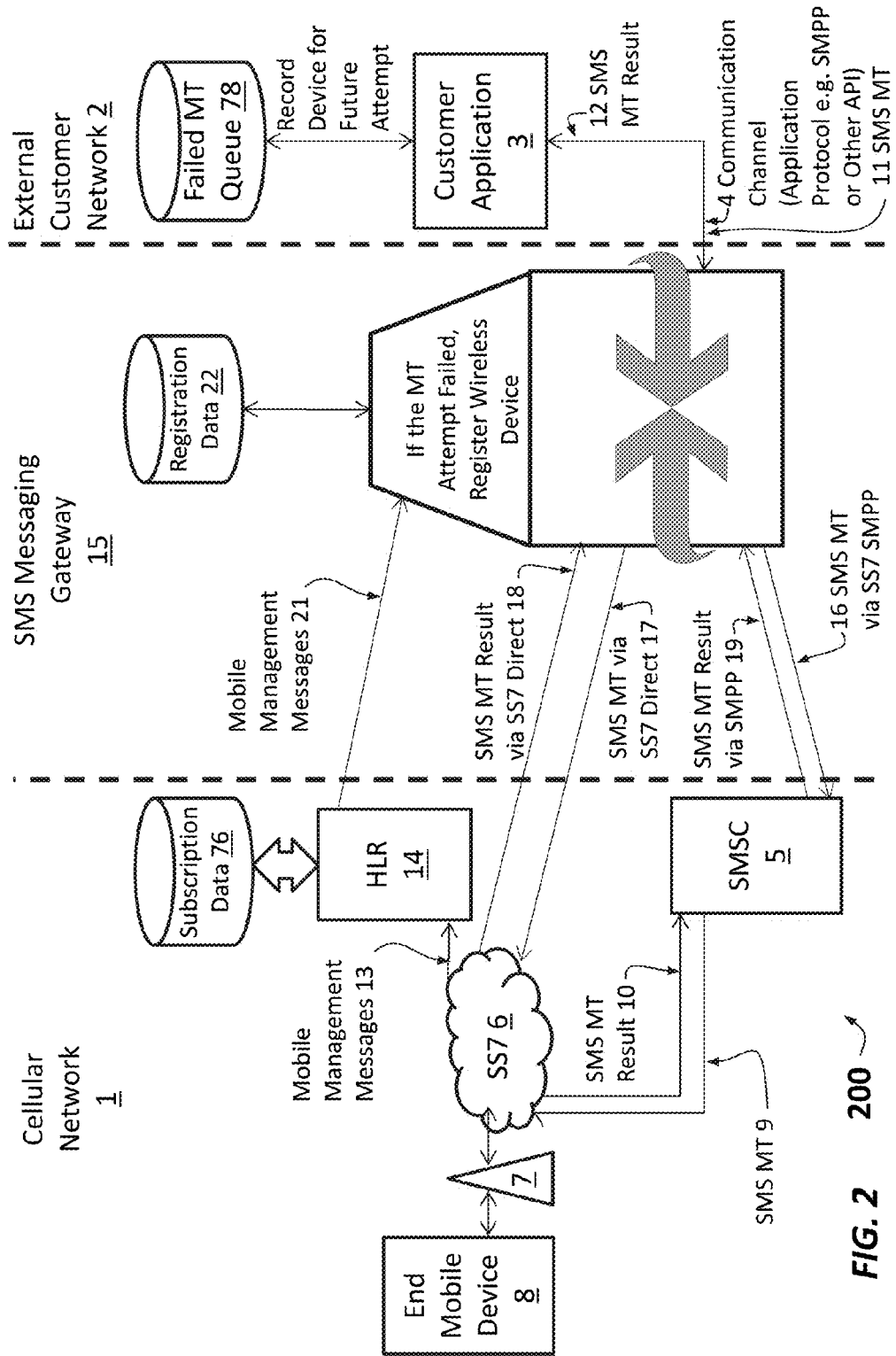
FIG. 2 illustrates a functional block diagram of another system providing another exemplary operating environment for an embodiment of the invention, wherein a digital gateway is located between a cellular network and external applications.

Turning now to FIG. 2, this figure illustrates a functional block diagram of another system 200 providing another example operating environment for an embodiment of the technology, wherein an example digital gateway, specifically a computer-based SMS Messaging Gateway 15, is located between a cellular network 1 and an external customer network 2 that comprises a customer application 3.

SMS message flow and/or device registration on the system 200 can comprise one or more aspects of the disclosure or teaching provided in U.S. patent application Ser. No. 13/848,804, entitled "Method and System for Efficiently Routing Messages," to Bryan Keith Tarleton, Michael J. Criscolo, Edward I. Comer, and William George Simitses. The entire contents of U.S. patent application Ser. No. 13/848,804 are hereby incorporated herein by reference.

In operation, the customer application 3 in the customer network 2 submits an SMS Mobile Terminate message 11 to the SMS messaging gateway 15 via the communications channel 4, typically using standard SMPP protocol. The SMS messaging gateway 15 submits the MT message 16 to the SMSC 5 in the cellular network 1, typically using standard SMPP protocol. The SMS messaging gateway 15 submits the MT message 17 directly to the wireless telecommunications system 7 using the SS7 network 6. The cellular network 1 submits the MT message 17 to the wireless telecommunications system 7 using the SS7 network communications links. The wireless telecommunications system 7 attempts to deliver the MT message 17 to the mobile device 8. An MT result message 10 from the wireless telecommunications system 7 is delivered to the SMSC 5. An MT result message 18 is delivered to the SMS messaging gateway 15 via SS7 communications links. An MT result message 19 is delivered to the SMS messaging gateway 15 from the SMSC 5. The result of the MT result message 12 is sent to the customer application 3 in the external customer network 2. A failed MT queue 78 records devices for future attempts.

Figure 3:
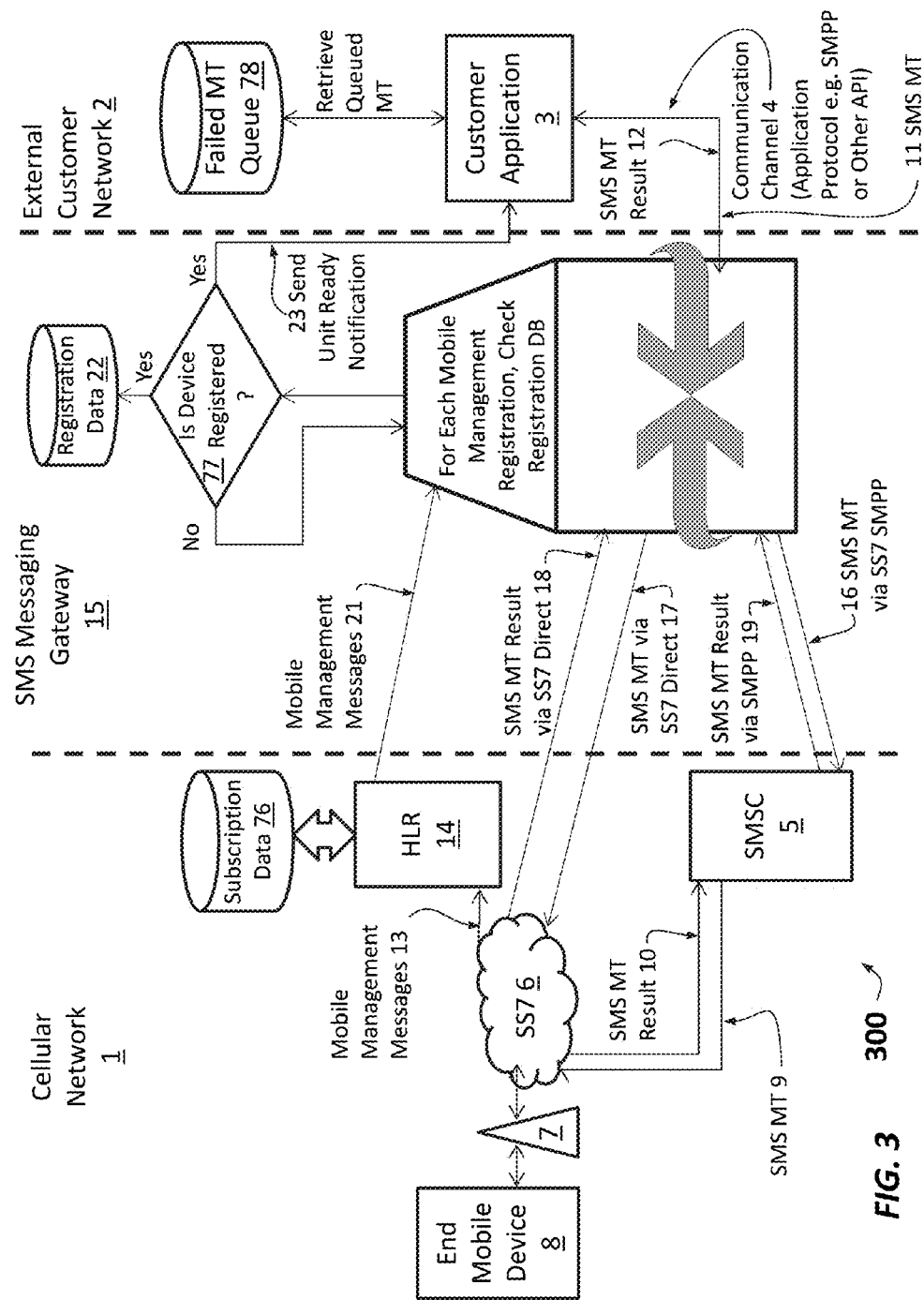
FIG. 3 illustrates a functional block diagram of another system in which the system illustrated in FIG. 2 has been enhanced to provide SS7 mobile management signaling messages for use by applications on an external customer network in accordance with exemplary embodiments of the invention.

Turning now to FIG. 3, this figure illustrates a functional block diagram of an example system 300 in which the system 200 illustrated in FIG. 2 has been enhanced to provide real-time SS7 mobile management signaling messages for use by customer applications 3 on the external customer network 2 in accordance with some embodiments of the technology. The system 300 illustrated in FIG. 3 can be viewed as overlaying an improved signaling technology or process upon the system 200 illustrated in FIG. 2 and upon the associated processes discussed above.

With real-time mobile management signaling messages, the signaling messages are delivered to the customer application 3 immediately upon receipt from the HLR 14, that is, within approximately one second. If the customer application 3 responds within a few seconds of receipt of the unit ready message by sending an MT message to the mobile device 8 represented by the registration, the likelihood of successful transmission of the MT to the device 8 is high, such as about 90%. In comparison, MT messages sent randomly, without the unit ready notification, typically experience a far lower success ratio, such as about 50%.

Numerous applications can benefit from the improved signaling provided by the system 300. For example, Machine-to-Machine (MTM) applications can use the signaling messages to better manage MT message submission to the wireless telecommunications system 7. The signaling messages may indicate that a mobile device 8 is registered and available on the cellular network 1, for example. The value of such signaling messages can diminish over time, especially for an MTM service mobile device as compared to a standard cellular mobile device used for cellular telephone service. The MTM device may have battery constraints and only power up occasionally and therefore not always be available. Additionally, cellular coverage may be lost as a device moves from one location to another.

In operation, the SMS messaging gateway 15 receives the MT result 18, as discussed above with reference to FIG. 2. When the MT result 18 is received, the SMS messaging gateway 15 inspects the MT result 18. If the result indicates a delivery failure for a registered customer application 3, a mobile device identifier for the associated end mobile device 8 is added to a registration database 22. Mobile management messages 13 can be constantly streamed to the HLR 14 independent of any other activity to register presence and location and to authenticate the end mobile devices 8. The HLR 14 may stream the mobile management messages 21 via Extensible Markup Language (XML) or other appropriate protocol to the SMS messaging gateway 15. The SMS messaging gateway 15 inspects the mobile identification for each of the mobile management messages 21 received from the HLR 14. Via this inspection, the SMS messaging gateway 15 compares the received messages 21 with mobile identifications associated with the customer application 3 that were previously stored in the registration database 22. (See inquiry 77.) If the SMS messaging gateway 15 matches a mobile identification received from the HLR 14 with a record of the registration database 22, then a unit ready notification message 23 is sent to the customer application 3. (See right "yes" branch from inquiry 77.) The response of the customer application 3 to receipt of a unit ready notification message 23 can be application dependent. One potential response is that the customer application 3 may use the unit ready notification message 23 to reattempt a previous failed MT 11 message by retrieval from a failed MT queue 78. If the mobile identification is found in the registration database 22, then the record is removed from the registration database 22. (See upper "yes" branch from inquiry 77.) If the mobile identification received from the HLR 14 does not match a registration record of database 22, then the next mobile management message 21 is retrieved.

In view of the foregoing, it will be understood that an exemplary SMS messaging gateway comprises a first communication interface for a first communication link to a Home Location Registry (HLR) for a cellular network; a second communication interface for a second communication link to a SS7 network for the cellular network; a third communication interface for a third communication link to a short message service center for the SS7 network; and a fourth communication interface to an external customer network. Instructions stored in a memory storage device and executable by a computer, can determine if a mobile device is registered based on a mobile message received via the first communication interface. If the mobile device is determined to be registered, the computer can send a unit-ready notification over the fourth communication interface Many modifications and other embodiments of the disclosures set forth herein will come to mind to one skilled in the art to which these disclosures pertain who has the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A method comprising the steps of:
   by a digital gateway, maintaining a database that associates mobile devices with a customer application,
      wherein the digital gateway comprises
         a first communication interface for a first communication link to a home location registry (HLR) for a cellular network;
         a second communication interface for a second communication link to an signalling system 7 (SS7) network for the cellular network;
         a third communication interface for a third communication link to a short message service center (SMSC) for the SS7 network; and
         a fourth communication interface for a fourth communication link to an external customer network, and
      wherein the customer application comprises a machine-to-machine application that resides on the external customer network;
   by the digital gateway, receiving a plurality of mobile management messages from the HLR via the first communication interface;
   by the digital gateway, comparing a mobile management message from the plurality of mobile management messages with the database to determine whether the mobile management message is associated with one of the mobile devices; and
   by the digital gateway, if the mobile management message is determined to be associated with the one of the mobile devices, sending notification to the customer application via the fourth communication interface that the one of the mobile devices is available,
   wherein the step of sending notification to the customer application comprises the digital gateway translating the mobile management message into a format compatible with the customer application, wherein the mobile management message has a protocol that is incompatible with the customer application and the translated mobile management message has a protocol that is compatible with the application.

2. The method of claim 1, wherein the digital gateway comprises an SMS messaging gateway.

3. The method of claim 1, wherein the digital gateway receives the plurality of mobile management messages as a stream.

4. The method of claim 1, wherein the digital gateway comprises an short message service (SMS) messaging gateway, wherein the plurality of mobile management messages are streamed from the HLR to the SMS messaging gateway via Extensible Markup Language (XML) protocol, and wherein the translated mobile management message comprises an application protocol message.

5. The method of claim 1, further comprising the step of by the digital gateway, if the mobile management message is determined to be associated with the one of the mobile devices, updating the database.

6. The method of claim 1, wherein the step of sending notification to the customer application comprises translating the mobile management message into an application notification message.

7. The method of claim 1, wherein the digital gateway comprises a messaging gateway that connects a plurality of external customer networks to at least one cellular network.

8. The method of claim 1, further comprising the step of by the digital gateway, receiving SMS mobile terminate (SMS MT) results via SS7.

9. The method of claim 1, further comprising the step of by the digital gateway, receiving SMS MT results from the SMSC via the third communication interface.

10. The method of claim 1, further comprising the steps of:
by the digital gateway, receiving SMS MT results via SS7; and
by the digital gateway, receiving SMS MT results from the SMSC.

11. A method comprising:
receiving a mobile terminate (MT) result at a gateway;
determining, at the gateway, whether the received MT result indicates a delivery failure for an application that resides on an external customer network;
if the delivery failure is indicated, then including in a registration database at the gateway a mobile device identifier that is associated with the MT result;
receiving, at the gateway, a mobile management message from a home location register, wherein the mobile management message has a first protocol that is incompatible with the application;
determining, at the gateway, whether the received mobile management message is associated with a mobile device based on comparing the mobile management message to a database; and
if the received mobile management message is determined to be associated with the mobile device, then, at the gateway, performing the steps of:
translating the mobile management message into a format compatible with the application so that the translated message has a second protocol that is compatible with the application; and
sending a notification to the application that the mobile device is available, the notification comprising the translated mobile management message.

12. The method of claim 11, wherein the gateway comprises an SMS messaging gateway.

13. The method of claim 11, wherein the application comprises a registered customer application.

14. The method of claim 11, wherein the gateway provides an interface between one or more cellular networks and one or more external customer networks.

15. The method of claim 11, further comprising the step of
at the gateway, translating another mobile management message into an application notification message having a protocol compatible with the application.

* * * * *